(12) United States Patent
Trichina

(10) Patent No.: US 8,855,298 B2
(45) Date of Patent: *Oct. 7, 2014

(54) TABLE LOOKUP OPERATION ON MASKED DATA

(71) Applicant: Spansion LLC, Sunnyvale, CA (US)

(72) Inventor: Elena Vasilievna Trichina, Munich (DE)

(73) Assignee: Spansion LLC, Sunnyvale, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 13/738,797

(22) Filed: Jan. 10, 2013

(65) Prior Publication Data

US 2013/0132706 A1 May 23, 2013

Related U.S. Application Data

(63) Continuation of application No. 11/639,683, filed on Dec. 15, 2006, now Pat. No. 8,422,668.

(51) Int. Cl.
| | | |
|---|---|---|
| G06F 21/00 | (2013.01) | |
| G06F 21/62 | (2013.01) | |
| G06F 12/10 | (2006.01) | |
| H04L 9/00 | (2006.01) | |
| G06F 7/76 | (2006.01) | |

(52) U.S. Cl.
CPC .... *G06F 12/1009* (2013.01); *G06F 2221/2107* (2013.01); *G06F 21/6209* (2013.01); *H04L 9/003* (2013.01); *G06F 7/76* (2013.01); *H04L 2209/046* (2013.01)
USPC ................. 380/28; 726/26; 713/189; 380/29; 714/733; 714/755; 714/756; 705/405

(58) Field of Classification Search
USPC ......................................................... 380/28
See application file for complete search history.

(56) References Cited

U.S. PATENT DOCUMENTS

| | | | |
|---|---|---|---|
| 5,996,103 A * | 11/1999 | Jahanghir | 714/755 |
| 6,295,606 B1 * | 9/2001 | Messerges et al. | 713/189 |
| 7,191,342 B1 | 3/2007 | New et al. | |
| 7,639,797 B2 | 12/2009 | Lee et al. | |
| 7,702,100 B2 | 4/2010 | Han et al. | |
| 7,873,161 B2 | 1/2011 | Sexton | |
| 2001/0043082 A1 | 11/2001 | Wittig et al. | |
| 2002/0012430 A1 | 1/2002 | Lim | |
| 2002/0110282 A1 | 8/2002 | Kraft et al. | |
| 2003/0044003 A1 | 3/2003 | Chari et al. | |
| 2003/0048903 A1 * | 3/2003 | Ito et al. | 380/263 |
| 2004/0049724 A1 * | 3/2004 | Bill et al. | 714/733 |
| 2004/0184602 A1 * | 9/2004 | Nadehara | 380/28 |
| 2004/0228482 A1 * | 11/2004 | Macchetti et al. | 380/28 |
| 2005/0190857 A1 * | 9/2005 | Braithwaite | 375/296 |
| 2005/0283714 A1 * | 12/2005 | Korkishko et al. | 714/781 |

OTHER PUBLICATIONS

Hernandez et al., "Low-Cost Advanced Encryption Standard (AES) VLSI Architecture: A Minimalist Bit-Serial Approach", SoutheastCon, 2005. Proceeding. IEEE, Date of Conference: Apr. 8-10, 2005, pp. 121-125.

* cited by examiner

*Primary Examiner* — Morshed Mehedi

(57) ABSTRACT

Processing of masked data using table lookups is described. A mask is applied to input data to generate masked input data. The mask and the masked input data are used in combination to locate an entry in a lookup table. The entry corresponds to a transformed version of the input data.

20 Claims, 5 Drawing Sheets

TABLE LOOKUP OPERATION ON MASKED DATA

RELATED U.S. APPLICATION

This application is a continuation application of the U.S. patent application with Ser. No. 11/639,683, filed Dec. 15, 2006, by Elena Vasilievna Trichina, and entitled "Table Lookup Operation on Masked Data," hereby incorporated by reference in its entirety.

TECHNICAL FIELD

Embodiments in accordance with the present invention generally relate to data processing.

BACKGROUND ART

The Advanced Encryption Standard (AES) is a round-based block cipher used in security applications. Each round of the AES cryptographic process includes up to four operations, known in the art as AddRoundKey, ShiftRow, MixColumn and SubByte. The AddRoundKey, ShiftRow and Mix-Column operations are linear operations, while the SubByte operation is a non-linear substitution step in which each byte of input data is replaced with another byte. The substitution may be made using a substitution table or switch box commonly referred to as the S-box and usually implemented as a lookup table.

Hardware implementations of AES can be vulnerable to side channel attacks, also referred to as simple power analysis (SPA), differential power analysis (DPA) and electromagnetic analysis (EMA) attacks. Side channel attacks exploit information, such as power consumption and electromagnetic emission, that can leak from a device during execution of the cryptographic process. Adversaries enter different patterns of input data and monitor the side channel information in order to develop hypotheses about correlations between the side channel information and the device's internal state as the input data is encrypted. Using these correlations, an adversary can subsequently uncover a secret key used to encrypt data by monitoring side channel information as the data is encrypted.

One countermeasure to side channel attacks is to mask input data and intermediate results with random values and execute operations on the masked data. Both the data and the key may be masked. The masked data and the mask are operated on in parallel in order to unmask the final result once all computations are completed; this is referred to as mask correction. However, as noted above, the SubByte operation is non-linear and so does not lend itself to simple mask correction. Various attempts have been made to efficiently and securely implement mask correction for non-linear operations. Such attempts are generally problematic because they are vulnerable to side channel attacks, involve too much computational overhead, require too much coprocessor area (e.g., there is an unsatisfactory increase in the number of gates required), or introduce unsatisfactory propagation delays.

Accordingly, a solution that efficiently and securely implements mask correction for non-linear operations would be advantageous. Embodiments in accordance with the present invention provide these and other advantages.

DISCLOSURE OF THE INVENTION

Processing of masked data using a lookup table (LUT) is described. Input data is used to locate an entry in the LUT. For each input value, the LUT provides an output value that is the result of a non-linear transformation (e.g., byte substitution) applied to the input value. A mask can be applied to the input data to generate masked input data. If the masked input data were used to locate an entry in the LUT, the entry would correspond to a transformed version of the masked input data. According to embodiments of the present invention, the masked input data and the mask are used in combination to locate a "corrected" entry in the LUT. The corrected entry corresponds to a transformed version of the unmasked input data.

These and other objects of the various embodiments of the present invention and their advantages will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "applying," "using," "locating," "generating," "identifying," "inverting," "decoding" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

Figure 1:
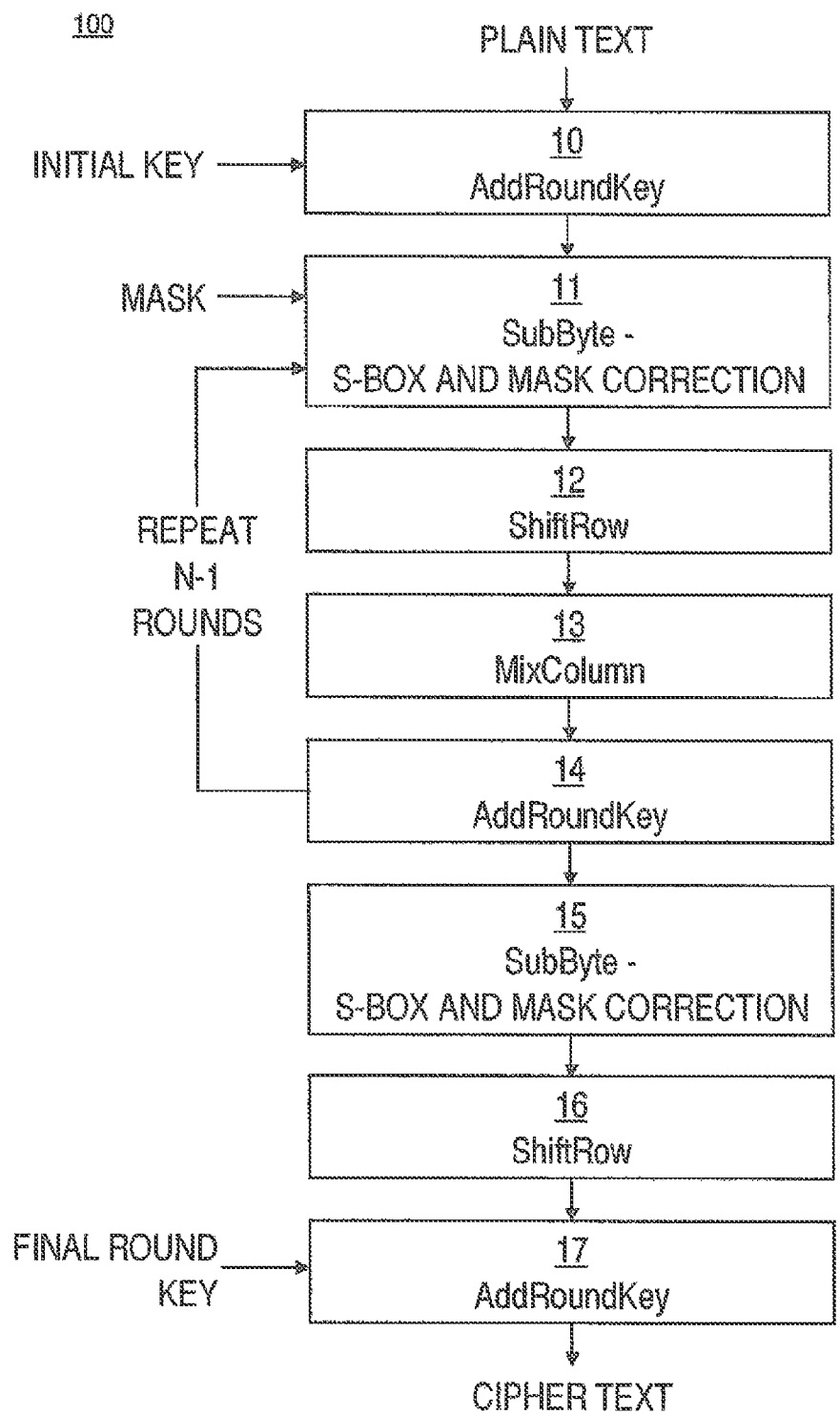
FIG. 1 is a flowchart showing data processing operations in an embodiment according to the present invention.

FIG. 1 is a flowchart 100 showing data processing operations in an embodiment according to the present invention. In particular, flowchart 100 pertains to a process for encrypting data according to the Advanced Encryption Standard (AES). However, as will be seen, embodiments in accordance with the present invention are not limited to AES applications or even encryption applications.

AES is a round-based symmetric block cipher. The standard key size is 128 bits, but for some applications 192-bit and 256-bit keys are also supported. A round consists of four (4) different operations—SubByte, ShiftRow, MixColumn and AddRoundKey—that are performed repeatedly in a certain sequence. Each operation maps a 128-bit input "state" into a 128-bit output state. Each state is represented as a 4×4 matrix of bytes. The number of rounds N depends on the key size. In the last round, the MixColumn operation is omitted, and prior to the main loop, the AddRoundKey operation is executed for initialization.

In block 10 of FIG. 1, an initial key is computed in a known fashion. Either the key or the plain text input data or both the plain text input data and the key are masked with some random masks using, for example, an XOR operation. The key can be combined with the plain text input data using, for example, an XOR operation.

In block 11, each byte of masked data is replaced with another byte using an S-box. In one embodiment, the S-box is the result of a composite of two transformations. First, each byte in a state is replaced with its reciprocal in the finite field (Galois field) $GF(2^8)$. The zero byte value, which has no reciprocal, is replaced by itself. Second, an affine transformation, consisting of a bitwise matrix multiply with a fixed 8×8 binary matrix followed by an XOR operation, is applied.

In the present embodiment, the S-box is implemented as a lookup table (LUT) consisting of 256 entries, each entry eight (8) bits wide. As will be seen, embodiments in accordance with the present invention can utilize the same LUT for both byte substitution and mask correction, by employing a number of "split-and-swap" operations for mask correction. Furthermore, as will be seen, the same LUT can be used even if the mask is changed.

For mask correction, the LUT is essentially "split" into a number of equally sized blocks, and the positions of two neighboring blocks are "swapped." In actual practice, the blocks within the LUT are not split and swapped. Rather, in the split operation, blocks within the LUT are identified, and in the swap operation, the addresses or indices of those blocks are exchanged. The split-and-swap operations are governed by the bit values of the mask.

For example, an 8-bit mask M has randomly selected bit values $m7, m6, \ldots, m0$, where $m7$ is the most significant bit (MSB) and $m0$ is the least significant bit (LSB). When the LSB ($m0$) is processed, the block consists of one LUT entry (one line of the LUT per block). Depending on the value of bit $m0$, pairs of neighboring lines may be swapped—the first and second lines of the LUT may be swapped, the third and fourth lines may be swapped, and so on. In the present embodiment, the split-and-swap operations are performed if bit $m0$ has a value of one.

In a similar fashion, when bit $m1$ is processed, the LUT may be split into 128 blocks of two lines each, and pairs of neighboring blocks may be swapped depending on the value of the $m1$ bit. In the present embodiment, if bit $m1$ has a value of one, then the first block, consisting of the first two lines (the first and second lines) of the LUT, may be swapped with the next block, consisting of the next two lines (the third and fourth lines) of the LUT, the third block (consisting of the fifth and sixth lines of the LUT) may be swapped with the fourth block (consisting of the seventh and eighth lines of the LUT), and so on.

The pseudo-code in Table 1 below describes the split-and-swap operations according to an embodiment of the present invention in which the LUT has 256 8-bit entries and the split-and-swap operations are performed for mask bit values of one. Note that the bits of the mask can be processed in any order.

TABLE 1

Exemplary Split-and-Swap Pseudo-Code

| |
|---|
| Input: Table T[256] such that T[i]=SubByte(i)<br>Random M=(m7,m6,...,m0), where m7 is MSB, m0 is LSB<br>Output: Table Tm[256] such that Tm[x⊕M]=T[x]<br>Begin<br>  Tm=T;<br>  For every m(i) from (m7,...,m0) in random order do:<br>    If m(i)=1 then<br>      (1) Split Tm into k=256/2$^{(8-i)}$ blocks, each block containing 2$^i$<br>      subsequent elements from T;<br>      (2) For j=1...k with step 2 do:<br>        a. Swap pair-wise j-th and j+1-st blocks<br>      (3) Assign result to Tm<br>  Return Tm; |

In general, according to embodiments of the present invention, one access logic can be used for byte substitution of the masked input data and another (different) access logic can be used for mask correction. Without mask correction, a byte of the masked input data would index a byte-sized "uncorrected" entry in the LUT. For mask correction, the bit values of a byte-sized mask are used along with the masked input data to locate a "corrected" entry in the LUT. In essence, mask correction is performed on the index. More specifically, the bit values of the mask can be used, in effect, to rearrange the LUT such that the masked input data indexes the corrected entry. The corrected entry corresponds to the transformed version of the input data (the pre-mask version of the data).

As mentioned above, the LUT is not rearranged in actual practice. Instead, as described in further detail in conjunction with FIGS. 3, 4, 5 and 6 below, the masked input data is acted on using a cascade of multiplexers that are controlled according to the bit values of the mask. The multiplexers manipulate the masked input data under control of the bit values of the mask to derive the index of the corrected entry. Therefore, the multiplexers are used for mask correction, and the same LUT can be used for both byte substitution and mask correction.

Moreover, according to embodiments of the present invention, the same LUT can be used even if the mask is changed; that is, there is no need to recompute values of the S-box for a new mask. Thus, the LUT may be implemented in hardware as read-only memory (ROM), synthesized logic using standard cells, or customized logic.

Continuing with reference to FIG. 1, in block 12 of the present embodiment, a cyclic shift operation is applied to each of four rows in a 4×4 byte state using 0 . . . 3 offsets.

In block 13, in the present embodiment, 4-byte data blocks in each column of a state are treated as coefficients of a 4-term polynomial and multiplied modulo $x^4+1$ with a fixed polynomial $c(x)=\{03\}x^3+\{01\}x^2+\{01\}x+\{02\}$.

In block 14, in the present embodiment, a bit-wise XOR operation is performed on the 128-bit round key and the data.

Blocks 11 through 14 can be repeated for N−1 rounds. The results of the SubByte operation (e.g., block 11) can be masked with a new randomly generated mask sometime after the SubByte operation. New masks may or may not be applied in the blocks 12, 13 and 14. Masked values and masks are processed in blocks 12, 13 and 14 in a conventional manner, with mask correction performed in parallel.

In the present embodiment, the final round (round N) includes blocks 15, 16 and 17. In blocks 15, 16 and 17, the same operations described previously for blocks 11, 12 and 14, respectively, are performed to yield the encrypted data (cipher text).

Figure 2:
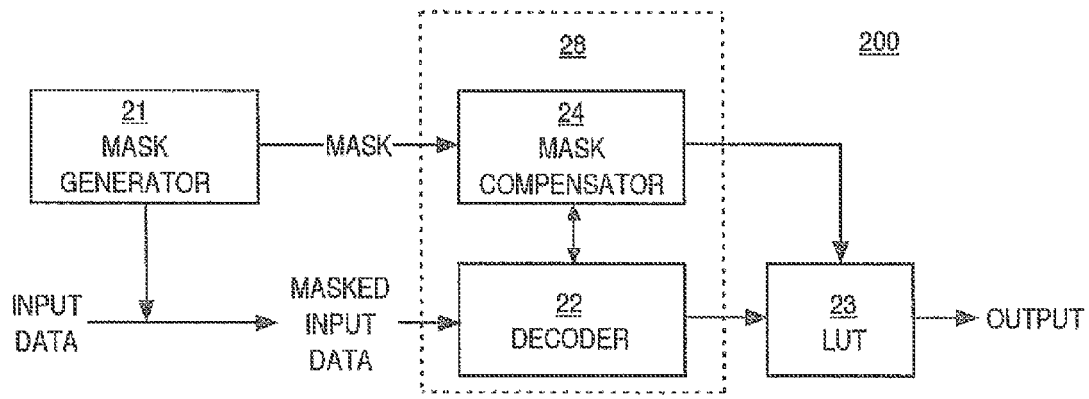
FIG. 2 is a block diagram of a data processing system in an embodiment according to the present invention.

FIG. 2 is a functional block diagram of a data processing system 200 in an embodiment according to the present invention. In one embodiment, system 200 is utilized in blocks 11 and 15 of FIG. 1. In the example of FIG. 2, system 200 includes a mask generator 21, a decoder 22, an LUT 23 and a mask compensator 24. System 200 may include elements in addition to those just mentioned. Also, in the discussion below, the elements of system 200 are discussed according to the functions they perform; however, functions described as being performed by multiple elements may be implemented as a single element, and vice versa. For example, mask compensator 24 can be integrated (e.g., interleaved) with decoder 22 as described in conjunction with FIGS. 3 and 4, below. Alternatively, mask compensator 24 can be implemented in series with decoder 22 as described in conjunction with FIGS. 5 and 6, below. Decoder 22 and mask compensator 24, whether implemented in series or interleaved, may be collectively referred to herein as augmented decoder 28 for simplicity of discussion.

In general, mask generator 21 of FIG. 2 generates a mask that is applied to input data to generate masked input data. The input data may or may not have been previously masked before it is input to system 200; if previously masked, it may be masked again in system 200. For simplicity of discussion, data that is input to system 200 is referred to herein as "unmasked input data" or "pre-mask input data."

Decoder 22 can be used to identify an entry in LUT 23 using the masked input data; this entry corresponds to a transformed version of the masked input data (referred to previously herein as the uncorrected version). In the example of FIG. 2, mask compensator 24 and decoder 22, in combination, identify an entry in LUT 23 using the mask and the masked input data; this latter entry corresponds to a transformed version of the pre-mask input data (referred to previously herein as the corrected version.)

More specifically, in one embodiment, LUT 23 is an S-box used in AES applications as described above (e.g., in blocks 11 and 15 of FIG. 1). In such an embodiment, decoder 22 is used to identify the entry in LUT 23 that corresponds to the masked input data values (the uncorrected version). Access to the LUT is via de-multiplexing, which effectively distributes a source signal (e.g., a read-enable signal) onto one of several possible destinations according to the value of a selector signal. Using LUT 23, each byte of masked input data is replaced with another byte.

Furthermore, according to embodiments of the present invention, the mask value and the decoded read-enable signals (decoded from the masked input data) can be input to mask compensator 24 of FIG. 2. Using the mask value, split-and-swap operations are performed on the read-enable signals to identify the corrected entry in LUT 23. The corrected entry, in essence, is the result that would have been produced if the pre-mask input data had been replaced byte-by-byte using LUT 23. Additional information is provided in conjunction with FIGS. 3, 4, 5 and 6, below.

To summarize, data transformation and mask correction can both be performed using the same LUT. For mask correction, the logic for accessing the LUT is as described in Table 1 and as further described in conjunction with FIGS. 3, 4, 5 and 6. Importantly, the LUT does not need to be reprogrammed for different mask values. Thus, LUT 23 can be implemented in hardware as ROM or synthesized logic.

Figure 3:
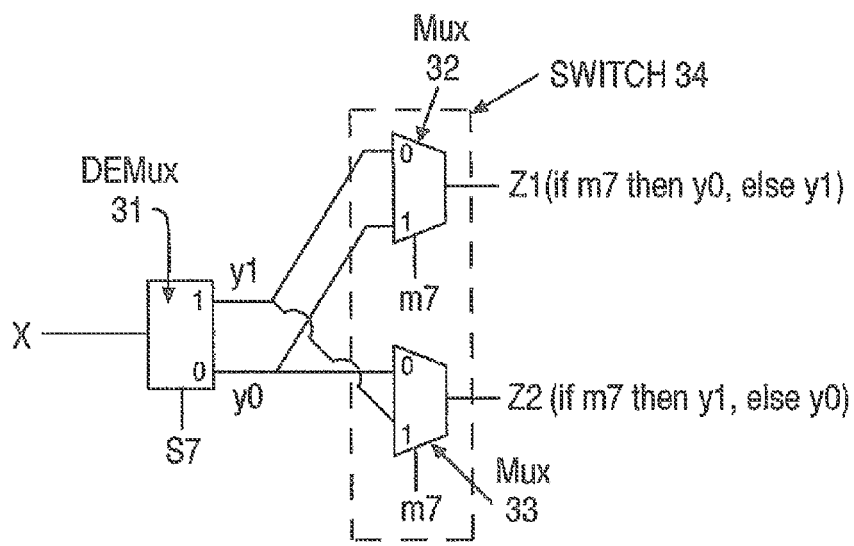
FIG. 3 illustrates a cascade of de-multiplexers and multiplexers in an embodiment according to the present invention.

In one embodiment, decoder 22 and mask compensator 24 include sets or stages of multiplexers and de-multiplexers that implement the split-and-swap mask correction operations described above. FIG. 3 illustrates one embodiment in which decoder 22 and mask compensator 24 of FIG. 2 are interleaved. In the example of FIG. 3, a de-multiplexer 31 is coupled to a multiplexer 32 and a multiplexer 33. In the example of FIG. 3, de-multiplexer 31 and multiplexers 32 and 33 represent the first stage of augmented decoder 28. Decoders with multiple stages can be formed using the configuration of FIG. 3 as a building block.

Continuing with reference to FIG. 3, consider an embodiment in which LUT 23 (FIG. 2) is implemented in ROM. A ROM is a combinational circuit whose structure is such that it can generate any Boolean function of 'n' variables, where 'n' is the number of ROM inputs. A ROM essentially consists of a decoder of a binary-encoded input number (an address), an array of OR gates, and a set of output drivers. The structure of a ROM is such that any Boolean function on 'n' variables can be generated. The decoder yields a selector signal for each input value, addressing each cell of the ROM. If there are 'n' input signals, then there are $2^n$ selector signals, and if there are 'k' outputs, then 'k' functions are generated simultaneously using the same decoder. For example, a ROM chip may have 8 outputs; that is, it generates 8 functions simultaneously using the same decoder.

An S-box implemented as an LUT in ROM with 8 inputs will generate 256 possible output values $y_i$, such that $y_i$=SubByte(i), where 'i' is the address or index of the i-th entry in the LUT. Access to the LUT is via de-multiplexing, which effectively distributes a source signal 'x' (e.g., a read-enable signal) onto one of several possible destinations $y_i$ according to the value of a selector signal 's.' Thus, the selector signal 's' denotes an index or address in the LUT. More specifically, the selector signal 's' corresponds to the pre-mask input data that is to be transformed using the S-box LUT. Using a standard binary encoding for s=s0*$2^0$+s1*$2^1$+ . . . +si*$2^i$+ . . . , the de-multiplexer function can be expressed as $y_i$=(if i=s then x else 0), or $y_i$=x*(i=s).

If the source signal 'x' is held constant with a value of 1, then the output $y_s$ is equal to 1 and all other outputs are zero. Thus, to read from a 256-entry S-box LUT, a read-enable signal 'x' is given as an input to an 8-to-256 decoder (which may be implemented as a cascade of de-multiplexers, as described below). The selector signal 's' corresponds to the input data (the pre-mask input data) to be transformed, which is the index to the S-box LUT, $i=s0*2^0+s1*2^1+\ldots+s7*2^7$. A decoder output of 1 selects an entry with index 'i,' that is, the value S[i]. The value of the read-enable signal for all other entries into the S-box LUT will be zero.

Consider an example in which a pre-mask value of zero for bit s7 corresponds to an index in the upper half of the LUT and a pre-mask value of 1 for bit s7 corresponds to an index in the lower half of the LUT, and in which an input value 's' is masked with the 8-bit mask '10x00' using an XOR operation (that is, the bit s7 is masked by XORing it with mask bit m7=1, and the other bits s6 . . . s0 are XORed with zero). If the pre-mask value of s7 is zero, the masked value of s7 (which would be 1) would correspond to the lower half of the LUT instead of the upper half. Similarly, if the pre-mask value of s7 is 1, the masked value of s7 (which would be zero) would correspond to the upper half of the LUT instead of the lower half.

In the example of FIG. 3, mask correction is implemented by swapping the output of the de-multiplexer 31. In one embodiment, this is achieved using the two multiplexers 32 and 33 coupled downstream of de-multiplexer 31. The multiplexers 32 and 33 are controlled by the value of the mask bit m7. The configuration that includes the two multiplexers 32 and 33 with two read-enable signals y0 and y1, one control signal 'm' and two read-enable outputs z1 and z2 is referred to herein as switch 34 (in FIG. 3, the control signal is mask bit m7, but in general, the control signal can be any bit of the mask value, as will be seen from the discussion below).

The de-multiplexer 31 and multiplexers 32 and 33 constitute a 2-to-2 decoder (also referred to previously herein as an augmented decoder). Larger decoders can be formed using the 2-to-2 decoder of FIG. 3 as a building block. For example, an 8-to-256 decoder can be represented as an 8-level cascade of 2-to-2 decoders. The first level would include a single 2-to-2 decoder, the next level would include two 2-to-2 decoders, and so on. At any level 'i' in the cascade of 2-to-2 decoders, there would be $2^i$ 2-to-2 decoders. For mask correction, at any level 'i' in the cascade of 2-to-2 decoders, the outputs y0 and y1 of each de-multiplexer 31 are provided as pair-wise inputs to two multiplexers 32 and 33 under control of the corresponding mask bit m(i). For byte substitution of the masked input data (that is, no mask correction), the multiplexers 32 and 33 can be bypassed.

Figure 4:
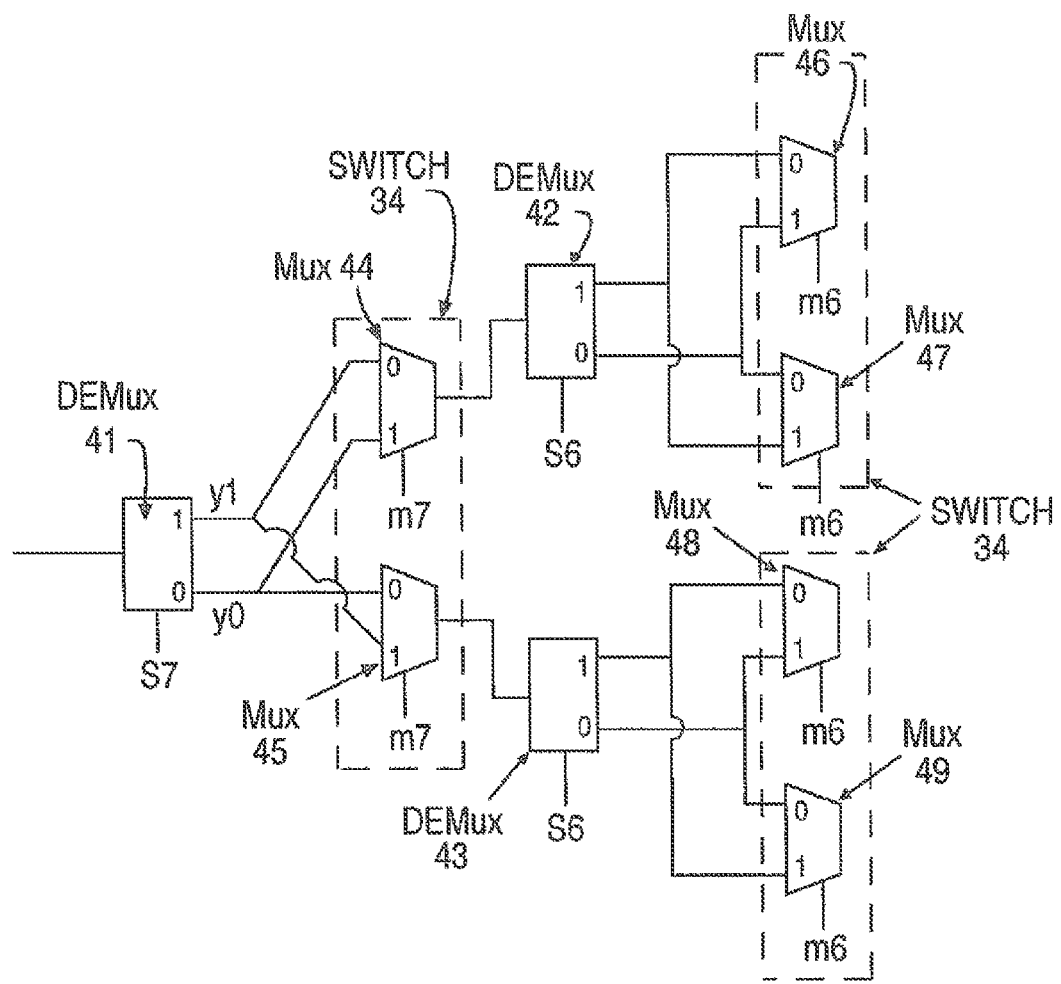
FIG. 4 illustrates a cascade of de-multiplexers and multiplexers in another embodiment according to the present invention.

FIG. 4 illustrates a 2-to-4 decoder (an augmented decoder) that includes a two-level cascade of de-multiplexers 41, 42 and 43 and multiplexers 44, 45, 46, 47, 48 and 49 in another embodiment according to the present invention. In the example of FIG. 4, the 2-to-2 decoder that includes de-multiplexer 41 and multiplexers 44 and 45 constitutes a first level of augmented decoder 28 of FIG. 2. The two 2-to-2 decoders that include, respectively, de-multiplexer 42 and multiplexers 46 and 47, and de-multiplexer 43 and multiplexers 48 and 49, constitute the second level of the augmented decoder 28.

In one embodiment, for mask correction, the outputs y0 and y1 of de-multiplexer 41 are provided as pair-wise inputs to the two multiplexers 44 and 45. In one such embodiment, for byte substitution of the masked data (no mask correction), the outputs of de-multiplexer 41 are provided as pair-wise inputs to de-multiplexers 42 and 43 (that is, the multiplexers 44 and 45 can be bypassed via connections that are not shown).

Figure 5:
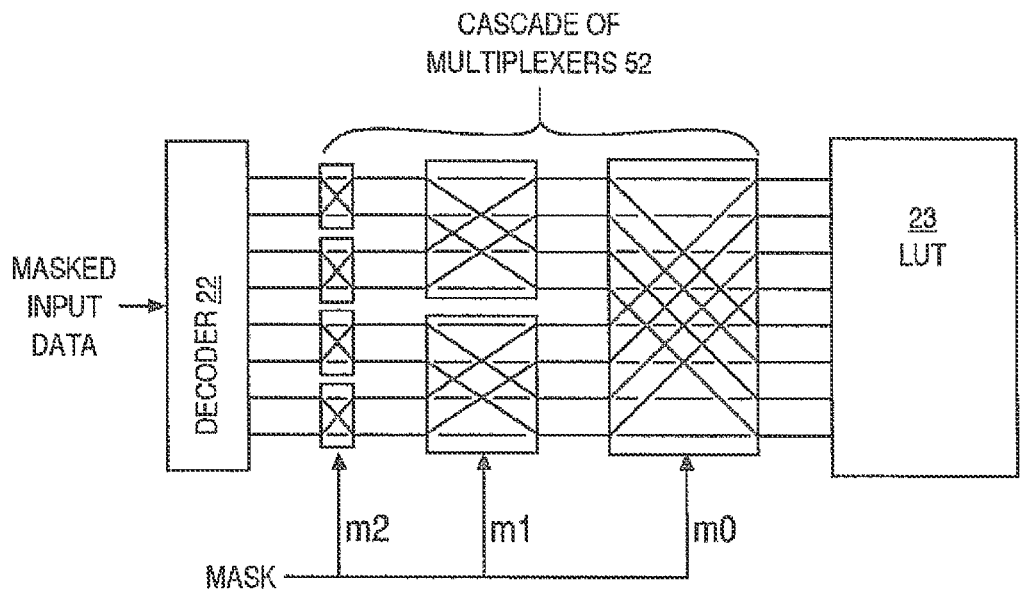
FIGS. 5 and 6 illustrate a cascade of multiplexers following a decoder according to various embodiments of the present invention.

In the examples of FIGS. 3 and 4, the de-multiplexers and multiplexers are interleaved; that is, the decoder 22 and mask compensator 24 of FIG. 2 are integrated. FIG. 5 illustrates a cascade of multiplexers 52 following decoder 22 in another embodiment of the present invention. In such an embodiment, decoder 22 includes a cascade of de-multiplexers. In the example of FIG. 5, instead of implementing multiplexers within each stage of the decoder 22 as in the examples of FIGS. 3 and 4, the multiplexers 52 are implemented as a cascade following the de-multiplexers.

In the example of FIG. 5, the cascade of de-multiplexers that constitute the decoder 22 are followed by a cascade of de-multiplexers 52 that constitute mask compensator 24 of FIG. 2. The decoder 22 may be an n-to-$2^n$ decoder that is used for accessing an LUT with n-bit input data. The mask compensator 24 takes $2^n$ outputs of the decoder 22 as one input, and the n-bit mask as a second (e.g., control) input. In the present embodiment, the mask compensator 24 represents an n-level cascade of multiplexers 52. At each level 'i' (i=1, . . . , n) of the cascade of multiplexers 52 representing mask compensator 24, there are $2^n$ 1-bit read-enable signals and one 1-bit control signal. The control signal represents one bit of the mask value. At each level of the cascade of multiplexers 52 of mask compensator 24, there are exactly $2^{n-1}$ switches 34 (FIG. 3).

In the example of FIG. 5, only three stages of multiplexers are illustrated. In one embodiment, there are 8 stages of multiplexers in the cascade 52. In general, the number of stages corresponds to the number of bits in the mask. At any stage 'i' of the cascade 52, there would be $2^{i-1}$ multiplexers. For AES, i=1, . . . , 8.

Figure 6:
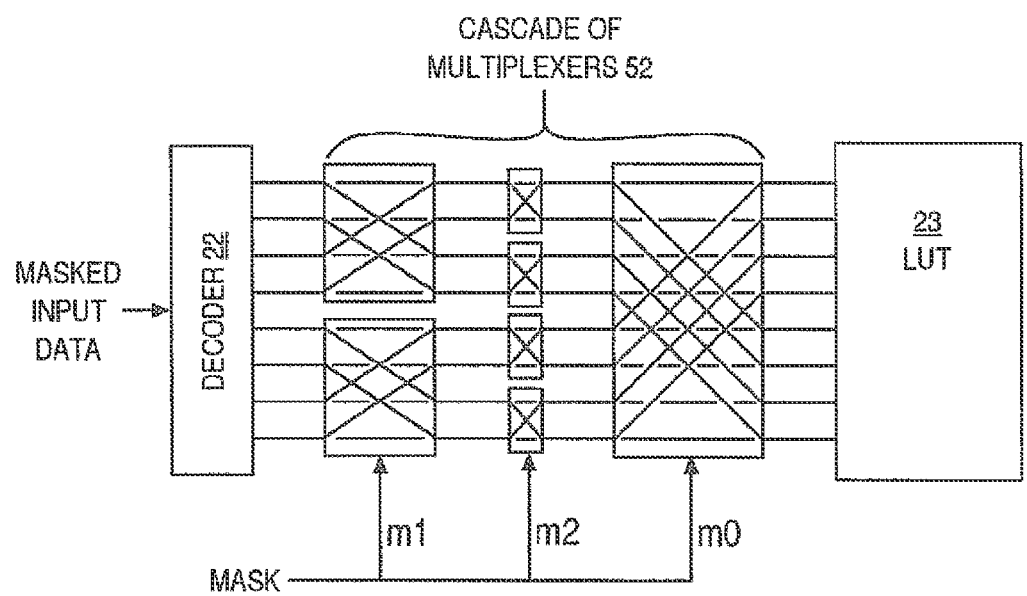

As shown by the example of FIG. 6, the control (e.g., mask) bits can be supplied to the mask compensator 24 in any order. The bits of the mask can be denoted as $m_0, \ldots, m_{n-1}$, wherein $m_0$ is the LSB and $m_{n-1}$ is the MSB. For AES, n=8. Suppose that in a particular implementation of mask compensator 24, at the stage 'i' of a cascade of switches 34 (FIG. 3), the j-th bit of the mask (e.g., bit $m_{j-1}$) is supplied as the control input (note that 'i' is not necessarily equal to 'j'). The $2^n$ read-enable inputs into the i-th stage of cascade of switches 34 can be split into $2^{n-j}$ logical blocks, where each block contains $2^j$ consequent read-enable input values. The input read-enabled values in block 't' can be denoted $in^t[1], in^t[2], \ldots, in^t[2^j]$, where t=1, . . . , $2^{n-j}$. The k-th input of block 't' and k-th input of the block t+1 (for every k=1, 2, . . . , $2^j$ and for every t=1, 3, 5, . . . , n−1) can be used as input y1 and input y0, respectively, of the corresponding switch 34 in the cascade of multiplexers 52 that constitute mask compensator 24.

In the interleaved embodiments of FIGS. 3 and 4, for an 8-bit mask, 256 multiplexers are utilized for mask compensation. A multiplexer can include two AND gates, an OR gate and an inverter. Thus, 1024 additional AND gates and 512 additional OR gates are utilized in an 8-to-256 decoder modified for mask correction according to the embodiments of FIGS. 3 and 4. In the embodiments of FIGS. 5 and 6, the number of additional multiplexers is 1736.

In comparison, a conventional masked S-box in a composite field can be implemented with approximately 1500 gate equivalents, with another 1500 gate equivalents needed for separate mask correction. Therefore, embodiments in accordance with the present invention compare favorably with area requirements for conventional designs.

Moreover, the power consumption of a conventional S-box implemented in a composite field is substantially greater than the power consumption of an S-box implemented as an LUT as described herein. This is due to high switching activity of the gates in the former case versus almost no switching activity in the latter case.

Furthermore, embodiments in accordance with the present invention can result in a 2-fold to 8-fold decrease in propagation delay.

As mentioned previously herein, instead of re-computing values of an S-box LUT for each new mask, the same ROM or synthesized logic can be used for different masks, by introducing access logic for mask correction in addition to the access logic used for byte substitution. As a result, each byte of input data can be masked with a different mask, thus increasing the noise-to-signal ratio of the encrypting device and hindering power analysis attacks.

Figure 7:
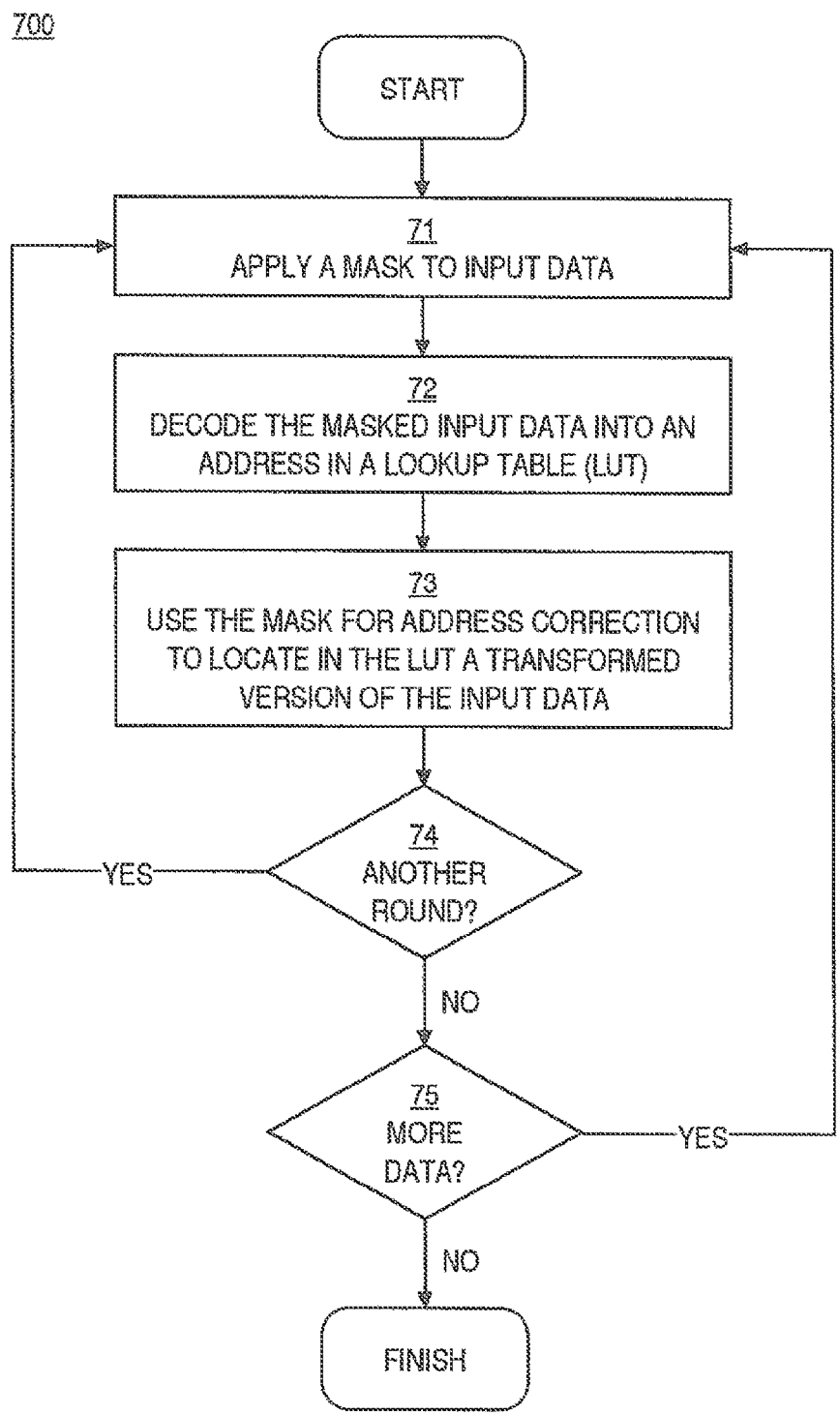
FIG. 7 is a flowchart of a data processing method in an embodiment according to the present invention.

FIG. 7 is a flowchart 700 of a data processing method in an embodiment according to the present invention. Although specific steps are disclosed in flowchart 700, such steps are exemplary. That is, embodiments of the present invention are well-suited to performing various other steps or variations of the steps recited in flowchart 700. The steps in flowchart 700 may be performed in an order different than presented, and not all of the steps in flowchart 700 may be performed.

In block 71, a mask is applied to input data. In one embodiment, the mask is XORed with the input data. The input data may already be masked prior to block 71. If that is the case, the input data may be masked again in block 71. In general, block 71 represents any operation or sequence of operations that results in input data being masked with some random value (e.g., a value that is unpredictable and independent from the input data or a key or both).

In block 72, the masked input data is decoded into an access address to an LUT. More specifically, in one embodiment, each byte of the masked input data is indexed to a corresponding byte-sized entry in the LUT.

In block 73, the mask applied to the input data in block 71 is used to identify a mask-corrected entry in the LUT, as previously described herein. In general, the bit values of the mask are used to manipulate corresponding read-enable bits, obtained in block 71, by decoding the masked input data to derive the index of the corrected byte-sized entry in the LUT. More specifically, the corrected entry represents a transformed version of the corresponding byte of the pre-mask input data, as if the pre-mask input data had been transformed without the mask.

Blocks 72 and 73 can be implemented in series or in an interleaved manner, as described above in conjunction with FIGS. 2-6.

In block 74 of FIG. 7, in an AES embodiment, if there is another round, then flowchart 700 returns to block 71. The same LUT can be used for each round, even if the mask changes from round to round. If there are no other rounds, flowchart 700 proceeds to block 75.

In block 75, if there is additional data to process, then flowchart 700 returns to block 71. The same LUT can be used for different input data and for different masks. If there is no other data, flowchart 700 concludes.

In summary, embodiments in accordance with the present invention efficiently and securely implement mask correction for non-linear operations. Although described herein in the context of non-linear operations used in AES applications, the present invention is not so limited.

According to embodiments of the present invention, the same LUT can be used even if the mask is changed; that is, there is no need to recompute values of the S-box for a new mask. Thus, the LUT may be implemented in hardware as ROM, synthesized logic using standard cells, or customized logic.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A data processing method comprising:
applying a mask to input data to generate masked input data;
transforming said masked input data into transformed data using byte substitution implemented using a lookup table (LUT); and
for mask correction of said transformed data, using said masked input data and said mask in combination to locate an entry in said LUT, said entry corresponding to a transformed and unmasked version of said input data.

2. The method of claim 1 wherein said LUT is implemented in read only memory.

3. The method of claim 1 wherein said LUT is implemented in hardware as synthesized logic.

4. The method of claim 1 wherein said masked input data is mapped to said entry in said LUT using an M-to-N decoder that is controlled by said mask, where M is the number of bits in said masked input data and N is the number of entries in said LUT.

5. The method of claim 4 wherein said decoder comprises a cascade of two-to-two decoders, wherein said cascade comprises a two-to-two decoder comprising a de-multiplexer having two outputs, wherein both said outputs are provided as inputs to each of two multiplexers, and wherein both said multiplexers are controlled according to a value of a corresponding bit of said mask.

6. The method of claim 4 wherein outputs of said decoder are provided as inputs to a cascade of multiplexers, wherein each of said multiplexers is controlled according to a value of a corresponding bit of said mask.

7. The method of claim 4 further comprising inverting a value of a bit in an output of said decoder if a corresponding bit in said mask has a first value, wherein if said corresponding bit has a second value said bit of said output is not inverted.

8. The method of claim 1 wherein first access logic is used for said byte substitution and second access logic different from said first access logic is used for said mask correction.

9. The method of claim 8 wherein said second access logic comprises a first multiplexer whose output is provided to a plurality of multiplexers, and wherein said first access logic bypasses said plurality of multiplexers.

10. A data processing method comprising:
applying a first mask to first input data to generate first masked input data;
applying a second mask to second input data to generate second masked input data, wherein said second mask is different from said first mask;

transforming said first masked input data into transformed data using byte substitution implemented using a lookup table (LUT); and for mask correction of said transformed data, using said first mask and said first masked input data to locate a first entry in said LUT, said first entry corresponding to a transformed and unmasked version of said first input data; and using said second mask and said second masked input data to locate a second entry in said LUT, said second entry corresponding to a transformed version of said second input data.

11. The method of claim 10 wherein said first masked input data and said second masked input data are respectively mapped to said first and second entries in said LUT using an M-to-N decoder that is controlled respectively by said first and second masks, where M is the number of input bits and N is the number of entries in said LUT.

12. The method of claim 11 wherein said decoder comprises a cascade of two-to-two decoders, wherein said cascade comprises a two-to-two decoder comprising a de-multiplexer having two outputs, wherein both said outputs are provided as inputs to each of two multiplexers; wherein to locate said first entry, outputs of both said multiplexers are selected according to a value of a corresponding bit of said first mask; and wherein to locate said second entry, outputs of both said multiplexers are selected according to a value of a corresponding bit of said second mask.

13. The method of claim 11 wherein outputs of said decoder are provided as inputs to a cascade of multiplexers; wherein to locate said first entry, outputs of each of said multiplexers are selected according to a value of a corresponding bit of said first mask; and wherein to locate said second entry, outputs of each of said multiplexers are selected according to a value of a corresponding bit of said second mask.

14. The method of claim 11 further comprising inverting a value of a bit in an output of said decoder if a corresponding bit in a corresponding mask has a first value, wherein if said corresponding bit has a second value said bit of said output is not inverted.

15. A data processing system comprising:

a mask generator comprising an XOR gate operable for generating a mask that is applied to input data to generate masked input data; and a decoder comprising a cascade of de-multiplexers and a cascade of multiplexers interleaved with said cascade of de-multiplexers, said decoder coupled to said mask generator and operable for transforming said masked data into transformed data using byte substitution implemented by accessing a lookup table (LUT), said decoder also operable for identifying an entry in said LUT using said masked input data and said mask in combination, said entry corresponding to a transformed and unmasked version of said input data.

16. The system of claim 15 wherein said LUT is implemented in read only memory.

17. The system of claim 15 wherein said LUT is implemented in hardware as synthesized logic.

18. The system of claim 15 wherein said de-multiplexers include a de-multiplexer having two outputs, wherein both said outputs are provided as inputs to each of two multiplexers and wherein both of said two multiplexers are controlled according to a value of a corresponding bit of said mask.

19. The system of claim 15 further comprising a second cascade of multiplexers downstream of said decoder, wherein outputs of said decoder are provided as inputs to said multiplexers in said second cascade and wherein each of said multiplexers in said second cascade is controlled according to a value of a corresponding bit of said mask.

20. The system of claim 15 wherein a value of a bit in an output of said decoder is inverted if a corresponding bit in a corresponding mask has a first value, wherein if said corresponding bit has a second value said bit of said output is not inverted.

* * * * *